(12) United States Patent
Ohtsuka et al.

(10) Patent No.: US 10,294,835 B2
(45) Date of Patent: May 21, 2019

(54) INTERNAL COMBUSTION ENGINE CONTROL SYSTEM

(71) Applicant: TOYOTA JIDOSHA KABUSHIKI KAISHA, Toyota-shi, Aichi-ken (JP)

(72) Inventors: Kaoru Ohtsuka, Mishima (JP);
Hiroyuki Sugihara, Suntou-gun (JP);
Shinji Sadakane, Susono (JP);
Noriyasu Adachi, Numazu (JP);
Shigehiro Sugihara, Susono (JP);
Keisuke Sasaki, Susono (JP);
Takayoshi Kawai, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 31 days.

(21) Appl. No.: 15/810,306

(22) Filed: Nov. 13, 2017

(65) Prior Publication Data
US 2018/0202329 A1 Jul. 19, 2018

(30) Foreign Application Priority Data

Jan. 13, 2017 (JP) ................................. 2017-004283

(51) Int. Cl.
| | |
|---|---|
| *F01L 1/047* | (2006.01) |
| *F01L 13/00* | (2006.01) |
| *F02D 13/02* | (2006.01) |
| *F02D 41/04* | (2006.01) |
| *F02D 13/08* | (2006.01) |
| *F02B 75/02* | (2006.01) |
| *F02B 75/18* | (2006.01) |
| *F02B 75/20* | (2006.01) |
| *F02D 41/00* | (2006.01) |

(52) U.S. Cl.
CPC .......... *F01L 13/0036* (2013.01); *F01L 1/047* (2013.01); *F02D 13/0226* (2013.01); *F02D 13/08* (2013.01); *F02D 41/042* (2013.01); *F01L 2013/0052* (2013.01); *F01L 2013/101* (2013.01); *F02B 75/02* (2013.01); *F02B 75/20* (2013.01); *F02B 2075/027* (2013.01); *F02B 2075/1816* (2013.01); *F02D 2041/001* (2013.01); *Y02T 10/18* (2013.01)

(58) Field of Classification Search
CPC ..... F01L 2001/0473; F01L 1/267; F01L 1/46; F01L 2013/0052; F01L 2800/03
USPC .......................................... 123/90.16, 90.18
See application file for complete search history.

(56) References Cited

U.S. PATENT DOCUMENTS

2009/0048764 A1* 2/2009 Fuwa ....................... F01L 1/34
701/105

FOREIGN PATENT DOCUMENTS

JP 07-217417 A 8/1995

* cited by examiner

*Primary Examiner* — Jorge L Leon, Jr.
(74) *Attorney, Agent, or Firm* — Sughrue Mion, PLLC (57) ABSTRACT

When a stop request to the engine is issued, it is determined whether or not all of the drive cams are large cams. When it is determined that at least one of the small cams is included in the drive cams, the engine is continued to drive for a while and a switch control for switching the drive cams from the small cams to the large cams is executed within the duration. A self-holding type solenoid is used to switch between the small cams and the large cams. In the switch control, a permission to stop the engine is output at a timing when the "pin protrudable section" of the final cylinder #2 has elapsed.

4 Claims, 10 Drawing Sheets

S2: IS THERE STOP REQUEST TO ENGINE?
S4: ARE ALL OF DRIVE CAMS LARGE CAMS?
S6: ENGINE STOP IS PERMITTED
S8: SWITCH REQUEST IS OUTPUT
S10: HAS PERIOD DURING WHICH FINAL PIN CAN PROTRUDE ELAPSED?
S12: STOP OF ENGINE IS EXTENDED

INTERNAL COMBUSTION ENGINE CONTROL SYSTEM

CROSS-REFERENCE TO RELATED APPLICATION

The present disclosure claims priority under 35 U.S.C. § 119 to Japanese Patent Application No. 2017-4283, filed on Jan. 13, 2017. The contents of this application are incorporated herein by reference in their entirety.

TECHNICAL FIELD

The present disclosure relates to an internal combustion engine control system.

BACKGROUND ART

JP H7-217417 A discloses an engine system in which a cam for driving an intake valve is switched between two types of cams. One is an intake cam for low engine speed and the other is an intake cam for fast engine speed. During engine stop, the conventional system keeps driving the engine for a predetermined period to switch the intake cam for high engine speed to the intake cam for low engine speed. If the engine system performs the cam switch after the engine restarts, an engine start failure may occur in association with a delay caused by the cam switch. In this regard, the conventional system performs the cam switch before the engine restarts, a good engine restart can be achieved.

JP H7-217417 A does not discuss details of the predetermined period. In general, it is expected that the predetermined period is set to be a reasonable period enough to complete the cam switch for sure. However, such period prolongs the driving period of the engine and causes reduction of fuel consumption. And it is obvious that such problem is especially prominent when the number of cylinders of the engine increases. As just described, there is room for improvement on the conventional system with regard to the fuel consumption of a multi-cylinder engine.

The present disclosure addresses the above problem, and an object of the present disclosure is, in a multi-cylinder engine system driving an intake valve with two types of cams, to suppress reduction of fuel consumption in association with the cam switch during the engine stop which is performed in anticipation of the engine restart.

SUMMARY

A first aspect of the present disclosure provides an internal combustion engine system comprising:
an internal combustion engine having multiple cylinders;
an intake valve which is provided in each of the cylinders;
two types of intake cams whose cam profile are different from each other, and are configured so that either one of the intake cam is selected for driving the intake valve;
multiple cam carriers which are provided on a camshaft of the internal combustion engine and carries the intake cams in units of cylinders or cylinder groups;
multiple actuators which are provided corresponding to the cam carries and are configured to slide the cam carries in the axial direction of the camshaft sequentially in accordance with protrusion operation of pins, wherein the pins are configured to engage with the corresponding cam carriers and also to switch drive cams for driving the intake valve actually between the intake cams; and a control device which is configured to:
output a switch request of the drive cams to the actuators when a stop request to the internal combustion engine is issued and also it is determined that the drive cams include a different profile from a predetermined profile; and
output a stop request to the internal combustion engine at a predetermined timing after the start of the protrusion operation of a final pin which engages with a final cam carrier and also before the start of the slide of the final cam carrier, wherein slide order of the final cam carrier in accordance with the switch request is the last of the cam carriers.

A second aspect of the present disclosure provides the internal combustion engine system according to the first aspect,
wherein each of the cam carriers comprises:
an inclined groove which is inclined with respect to an axial direction of the camshaft and a first orthogonal groove; and
second orthogonal groove which are orthogonal to the camshaft and communicate with the inclined groove at both ends of the inclined groove,
wherein the switch request is a request to cause the pins to protrude while being opposed to the first orthogonal groove and then to move in the first orthogonal groove, the inclined groove and the second orthogonal groove in this order,
wherein the predetermined timing is a timing before the final pin approaches the inclined groove of the final cam carrier.

A third aspect of the present disclosure provides the internal combustion engine system according to the second aspect,
wherein the predetermined timing is a start timing of the protrusion operation of the final pin.

A fourth aspect of the present disclosure provides the internal combustion engine system according to the third aspect,
wherein the actuators are self-holding type solenoids which are configured to cause the pins to protrude by energizing an exciting coil and keep the pins protruding even after the energization to the exciting coil is cut off,
wherein the switch request includes a request to start energizing the exciting coil of the solenoid corresponding to the final cam carrier so that the protrusion operation of the final pin is started at the earliest timing during the protrusion operation of the final pin is possible.

According to the first aspect, when the output the stop request of the internal combustion engine is issued it is possible to output to the actuators the switch request of the drive cams while holding a response to the stop request. Further, it is possible to output the stop request at the predetermined timing after the start of the protrusion operation of the final pin and also before the start of the slide of the final cam carrier. Therefore, deterioration of fuel consumption can be suppressed as compared with a case where the stop request is output after the start of the slide of the final cam. Note that the protrusion operation of the final pin is started at the predetermined timing. Therefore, even when the internal combustion is stopped at the predetermined timing, the final pin can be engaged with the final cam at engine cranking at the subsequent restart by continuing the protrusion operation of the final pin over the engine stop period. When the camshaft rotates at the restart, the final cam carrier in the engaged state slides and the drive cam of the cylinder or the cylinder groups corresponding to the final cam carrier can be switched to the cam carrier with the predetermined cam profile.

According to the second aspect, the stop request to the internal combustion engine is output at the timing before the final pin approaches the inclined groove of the final cam carrier. That is, the stop request is output at a timing during the final pin moves in the first orthogonal groove of the final cam carrier. Therefore, deterioration of fuel consumption can be suppressed as compared with a case where the stop request is output after the final pin moves from the first orthogonal groove into the inclined groove of the final cam carrier.

According to the third aspect, the stop request is output at the start timing of the protrusion operation of the final pin. When the stop request is output at the start timing, an operation period of the internal combustion engine is shortened as compared with the operation period of the second aspect by a period during which the final pin moves in the first orthogonal groove of the final cam carrier. Therefore, the deterioration of fuel consumption can be minimized.

According to the fourth aspect, the protrusion operation of the final pin is started at the earliest timing during the protrusion operation of the final pin is possible. Therefore, it is possible to advance the predetermined timing to an earlier timing.

DESCRIPTION OF EMBODIMENTS

Hereinafter, embodiments of the present disclosure will be described based on the drawings. Note that the common elements in each drawing are assigned the same reference numerals, respectively, and the duplicate description is omitted.

First Embodiment

Figure 1:
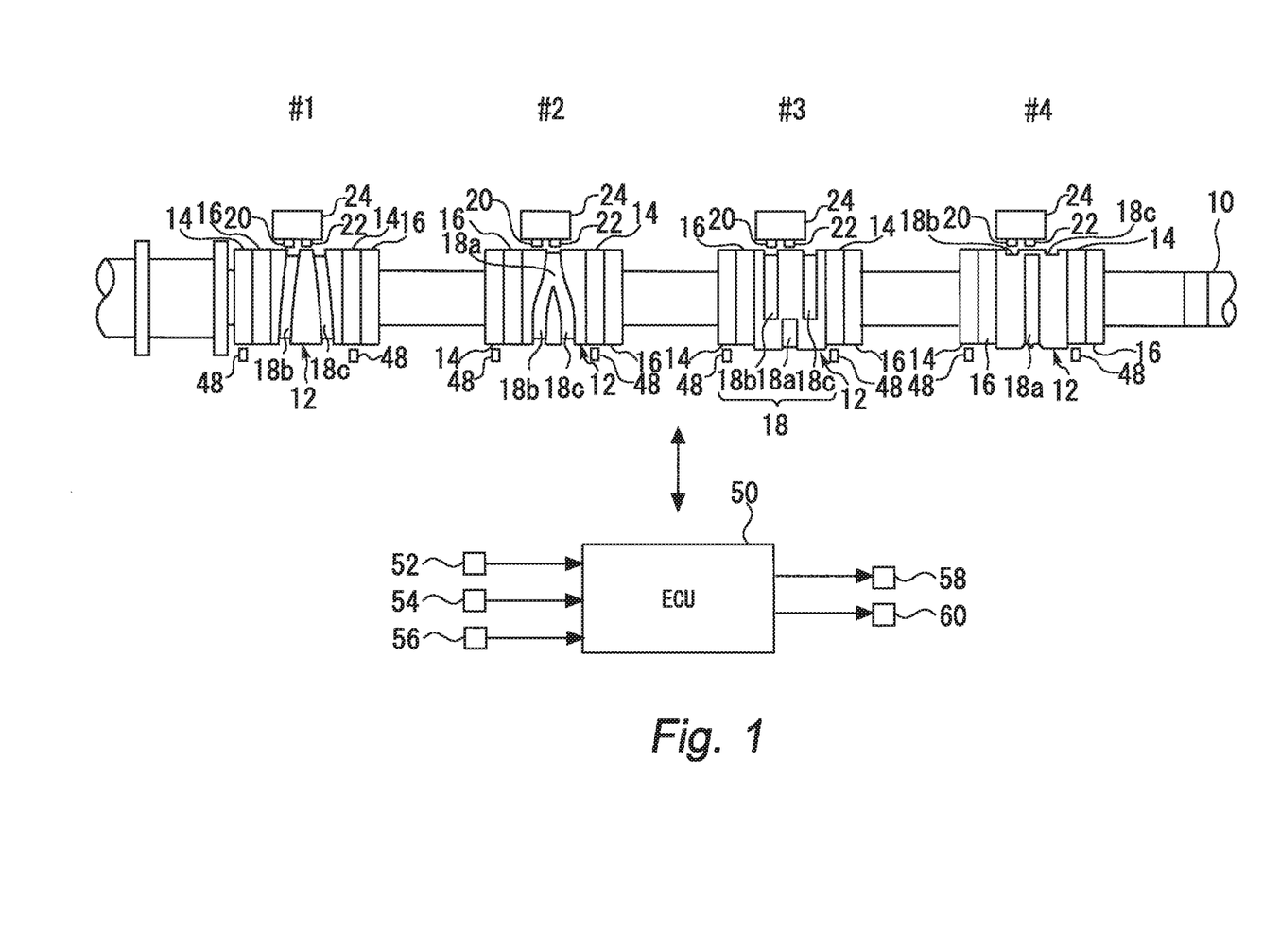
FIG. 1 is a schematic diagram for illustrating a configuration example of a system according to a first embodiment of the present disclosure.

Firstly, a first embodiment of the present disclosure will be described with reference to FIGS. 1 to 6.
[Description of System Configuration Example]
FIG. 1 is a schematic diagram for illustrating a configuration example of a system according to a first embodiment of the present disclosure. A system illustrated in this figure is an internal combustion engine system mounted on a vehicle. The internal combustion engine is a four-stroke reciprocating engine and also is an in-line four cylinder engine. The ignition order of this engine is made to be an order of a first cylinder #1, a third cylinder #3, a fourth cylinder #4 and a second cylinder #2. The number of cylinders and the cylinder arranged of the internal combustion engine to which the present disclosure is applied is not particularly limited. The ignition order of the cylinders is also not particularly limited.

A valve operating system shown in FIG. 1 comprises a cam shaft 10. The cam shaft 10 is connected with a crankshaft (not illustrated), and is rotated in synchronism with the crankshaft. Four cam carriers 12 are arranged at intervals on the cam shaft 10, each of the cam carriers having a hollow shaft formed therein. The cam carriers 12 are slidably arranged in an axial direction of the cam shaft 10 while being fixed in a rotational direction of the cam shaft 10. The cam carrier 12 includes two types of intake cams 14 and 16 that have different profiles (profile means at least one of a lift amount and an operation angle, the same shall apply hereinafter), the intake cams 14 and 16 being provided adjacently to each other.

In the first embodiment, the intake cam 14 has an operation angle and a lift amount that are smaller than those of the intake cam 16, for example. Hereinafter, the intake cam 14 and the intake cam 16 are also called as a "small cam 14" and a "large cam 16," respectively, for the convenience of description. Two pairs of small and large cams 14 and 16 are provided for each cylinder, because two intake valves are disposed for each cylinder. In the present disclosure, the number of intake valves per cylinder may be one, or three or more.

A surface of the cam carrier 12 has a groove 18 formed thereon and spirally extending while rotating in the axial direction of the cam shaft 10. The grooves 18 respectively provided on the cam carriers are formed with a phase difference among the cylinders. Specifically, the phase difference of 90° is provided between the groove 18 for the first cylinder #1 and the groove 18 for the third cylinder #3, between the groove 18 for the third cylinder #3 and the groove 18 for the fourth cylinder #4, between the groove 18 for the fourth cylinder #4 and the groove 18 for the second cylinder #2, and between the groove 18 for the second cylinder #2 and the groove 18 for the first cylinder #1. In the groove 18 for each cylinder, two branches join one branch in midway. Hereinafter, to particularly distinguish parts of the groove 18, a part after joining of the groove 18 is denoted as a groove 18a, and parts before joining of the groove 18 are denoted as grooves 18b and 18c. The depth of the groove 18a is not constant but is shallower toward the end portion of the groove 18a between the middle portion and the end portion.

The valve system illustrated in FIG. 1 includes an actuator 24 having two pins 20 and 22 for each cylinder. When the pin 20 (or the pin 22) is protruded from the actuator 24, the pin 20 (or the pin 22) is inserted into the groove 18 so as to be engaged with each other. When the pin 20 (or the pin 22) inserted into the groove 18 is retracted into the actuator 24, the pin 20 (or the pin 22) is removed from the groove 18 so that the engagement between them is released. Hereinafter, when there is particularly no need to distinguish between the pins 20 and 22, the pins 20 and 22 are simply referred to as "pins".

Figure 2A:
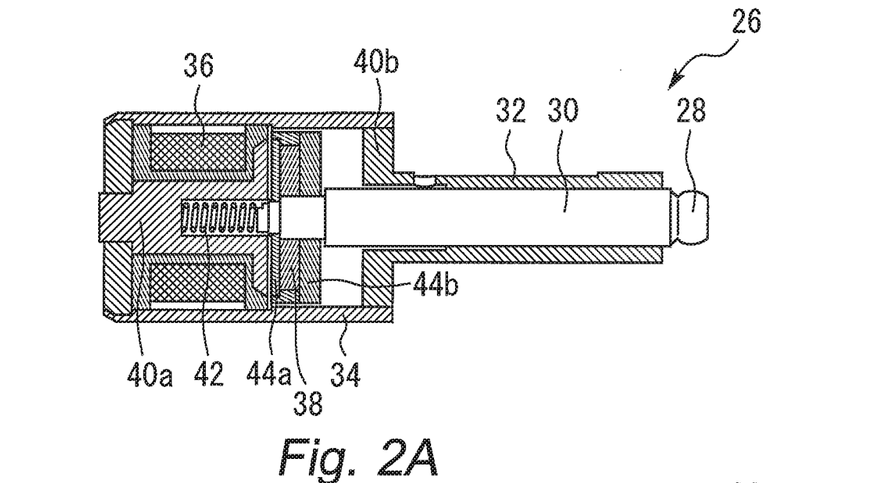
FIGS. 2A and 2B are diagrams for illustrating a configuration example of a self-holding type solenoid.
Figure 2B:
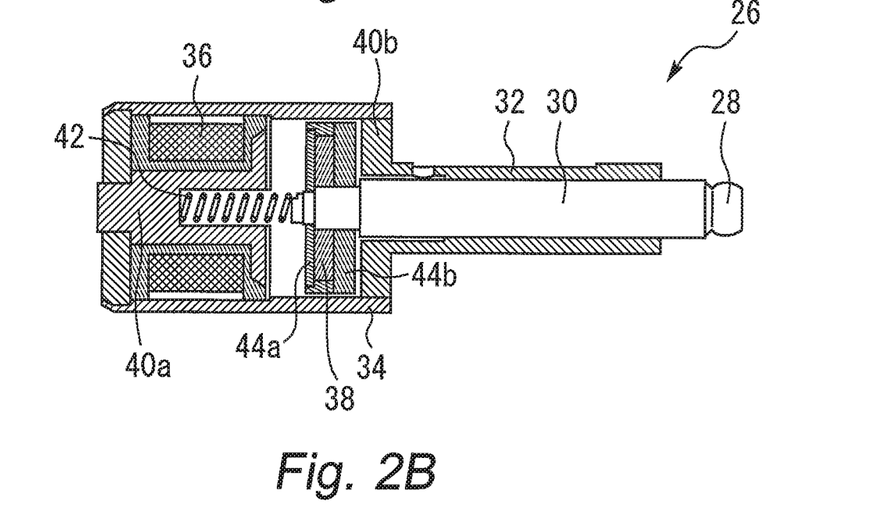

The actuator 24 is constructed by a self-holding type solenoid. FIG. 2 is a diagram for illustrating a configuration example of a self-holding type solenoid. As shown in FIG. 2, a solenoid 26 includes a plunger 30 having an engagement portion 28 at its tip, a sleeve portion 32 which supports the plunger 30 and a housing 34 which supports the sleeve portion 32. Inside the housing 34, an exciting coil 36, a permanent magnet 38, bases 40a and 40b, and a spring 42 are arranged.

As shown in FIG. 2, the permanent magnet 38 and the spring 42 are provided on a based end of the plunger 30. On both sides of the permanent magnet 38, magnetic disks 44a and 44b are provided. In FIG. 2, the urging force of the spring 42 acts in a direction to separate the plunger 30 from the base 40a. However, in the state shown in FIG. 2A, the magnetic force generated between the permanent magnet 38 and the base 40a exceeds the biasing force of the spring 42. Therefore, the magnet disk 44a abuts on the base 40a and the plunger 30 is retracted into the housing 34.

In the state shown in FIG. 2A, when the exciting coil 36 is energized to generate a magnetic field in a direction canceling the magnetic force between the permanent magnet 38 and the base 40a, the magnetic force is weakened. When the magnetic force becomes lower than the elastic force of the spring 42, the magnetic disk 44a separates from the base 40a and the permanent magnet 38 moves to a position where the magnetic disc 44b abuts on the base 40b. As a result, the plunger 30 protrudes from the housing 34. When the energization to the exciting coil 36 is cut off when the plunger 38 is protruded, a magnetic force is generated between the permanent magnetic 38 and the base 40b. Therefore, in the state shown in. FIG. 2B, the magnetic disk 44b continues to abut on the base 40b and the plunger 30 is continued to protrude from the housing 34.

In this manner, according to the self-holding type solenoid shown in FIG. 2, the plunger 30 can be protruded from the housing 34 by energizing the exciting coil 36. In addition, the protruding state of the plunger 30 can be maintained even after the energization to the exciting coil 36 is cut off. Note that the protruding state is released by pushing the plunger 30 from the shallow groove end of the groove 18a illustrated in FIG. 1. When the plunger 30 is pushed from the shallow groove, the magnetic disc 44b moves away from the base 40b and the permanent magnet 38 moves toward the base 40a. Then, a magnetic force is generated between the permanent magnet 38 and the base 40a and the permanent magnet 38 moves to a position where the magnetic disc 44a abuts on the base 40a. As a result, the plunger 30 is retracted into the housing 34. That is, the state of the solenoid 26 returns from the state shown in FIG. 2B to the state shown in FIG. 2A.

[Description of Switch Operation Example of Intake Cams]

Figure 3A:
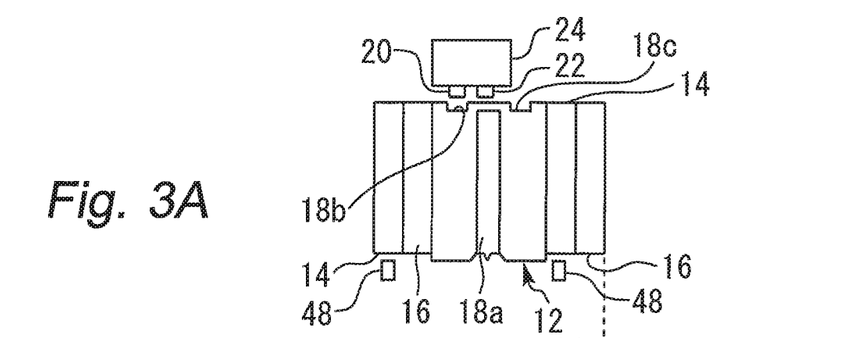
FIGS. 3A to 3D are diagrams for illustrating a rotational operation example of a cam carrier 12 by engagement between a pin 20 and a groove 18 illustrated in FIG. 1.

FIGS. 3A to 3D are diagrams for illustrating an example of a rotational operation of the cam carrier 12 by engagement between the pin 20 and the groove 18. In FIGS. 3A to 3D, assume that the cam carrier 12 is rotated from an upper side to a lower side. For the convenience of description, FIGS. 3A to 3D illustrate only the cam carrier 12 and the actuator 24, and rocker arm rollers 48 that come into contact with the small cam 14 and the large cam 16. In FIG. 3A, both of the pins 20 and 22 are retracted into the actuator 24. The pin 20 is positioned to face the groove 18b, whereas the pin 22 is positioned to face a part of the cam carrier 12 where the groove 18 is not formed.

Figure 3B:
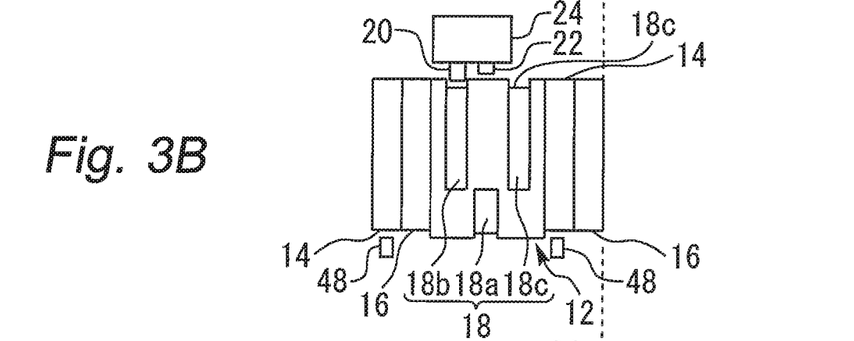

FIG. 3B illustrates a posture of the cam carrier 12 that is rotated by 90° from a state illustrated in FIG. 3A. As being understood by a comparison between FIG. 3B and FIG. 3A, when the cam carrier 12 is rotated, the groove 18a is moved to a back side of the cam carrier 12, whereas the grooves 18b and 18c are moved to a front side of the cam carrier 12. The grooves 18b and 18c illustrated in FIG. 3B are orthogonal to the shaft of the cam carrier 12. Hereinafter, the parts of the grooves 18b and 18c illustrated in FIG. 3B are also referred to as "orthogonal portions." In FIG. 3B, the pin 20 is protruded from the actuator 24. The pin 20 is protruded while the orthogonal portion of the groove 18b faces the pin 20. The pin 20 protruded from the actuator 24 is smoothly inserted into the orthogonal portion of the groove 18b and engaged with the groove 18b.

Figure 3C:
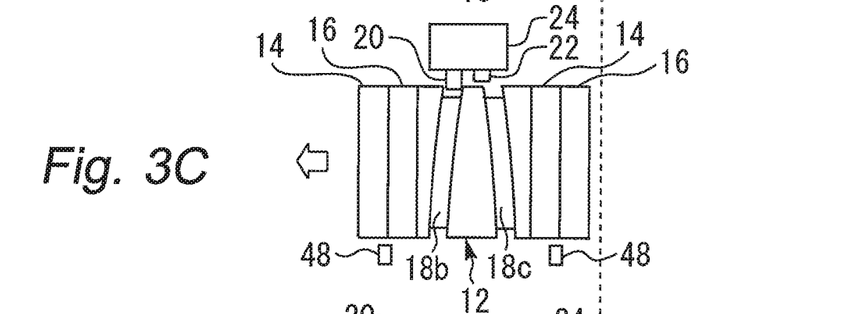

FIG. 3C illustrates a posture of the cam carrier 12 that is rotated by 90° from a state illustrated in FIG. 3B. As being understood by a comparison between FIG. 3C and FIG. 3B, when the cam carrier 12 is rotated, the whole area of the groove 18a is completely moved to the back side of the cam carrier 12, whereas the grooves 18b and 18c are further moved to the front side of the cam carrier 12. The grooves 18b and 18c illustrated in FIG. 3C are inclined with respect to the shaft of the cam carrier 12. Hereinafter, the parts of the grooves 18b and 18c illustrated in FIG. 3C are also referred to as "inclined portions." As being understood by a comparison between FIG. 3C and FIG. 3B, the cam carrier 12 is slid in a left direction, because the pin 20 in the engagement state with the groove 18b is moved along the inclined portion of the groove 18b.

Figure 3D:
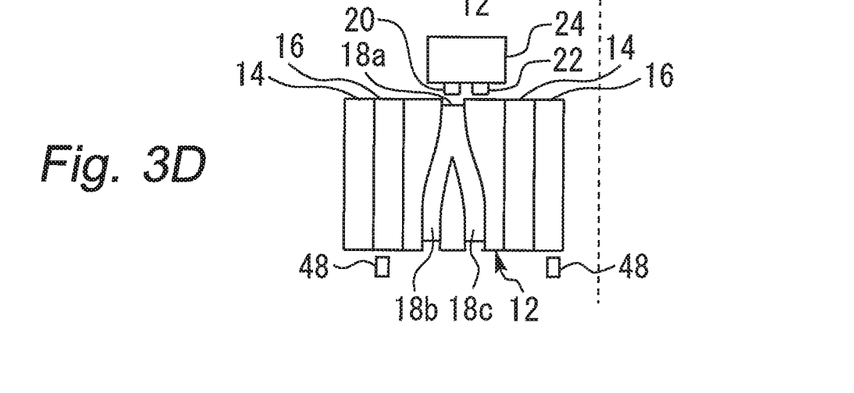

FIG. 3D illustrates a posture of the cam carrier 12 that is rotated by 90° from a state illustrated in FIG. 3C. As being understood by a comparison between FIG. 3D and FIG. 3C, when the cam carrier 12 is rotated, the inclined portions of the grooves 18b and 18c are moved to the back side of the cam carrier 12, whereas the groove 18a is moved to the front side of the cam carrier 12. Along with the rotation of the cam carrier 12, the pin 20 moves from the groove 18b to the groove 18a. In FIG. 3D, the pin 20 is retracted by pushing the pin 20 from the shallow groove end of the groove 18a.

As being understood from FIGS. 3A to 3D, when the cam carrier 12 is slid in the left direction, the cam with which the rocker arm roller 48 comes into contact is switched from the small cam 14 to the large cam 16.

The switch operation from the large cam 16 to the small cam 14 is performed as follows. The cam carrier 12 is further rotated from the state illustrated in FIG. 3D, and the pin 22 is protruded from the actuator 24 at a timing when the pin 22 faces the groove 18c. Thus, the pin 22 is inserted into the groove 18c. The pin 22 in the engagement state with the groove 18c is moved along the orthogonal portion and the inclined portion of the groove 18c, and the cam carrier 12 is slid in a right direction. After the pin 22 moves to the groove 18a, the pin 22 is retracted into actuator 24 by pushing the pin 22 from the shallow groove end of the groove 18a. Accordingly, the cam with which the rocker arm roller 48 comes into contact is switched from the large cam 16 to the small cam 14.

Referring back to FIG. 1, the system configuration example is continuously described. The system illustrated in FIG. 1 includes an ECU 50 as a control device. The ECU 50 includes a RAM (random access memory), a ROM (read only memory), a CPU (microprocessor), and the like. The ECU 50 receives and processes signals from various sensors mounted on a vehicle. The various sensors include at least a crank angle sensor 52 that outputs a signal in accordance with a rotation angle of the crankshaft, a gap sensor 54 that detects an intake cam facing the rocker arm rollers 48 (hereinafter, also referred to as "drive cams"), and an ignition key 56 that outputs a signal for starting an engine (IG signal) and a signal for stopping the engine (IG-OFF signal). The ECU 50 processes the signals received from the various sensors, and operates various actuators in accordance with a predetermined control program. The various actuators include a fuel injection valve 58 and an ignition device 60 for each cylinder in addition to the actuator 24 mentioned above.

[Cam Switch Control]

Figure 4:
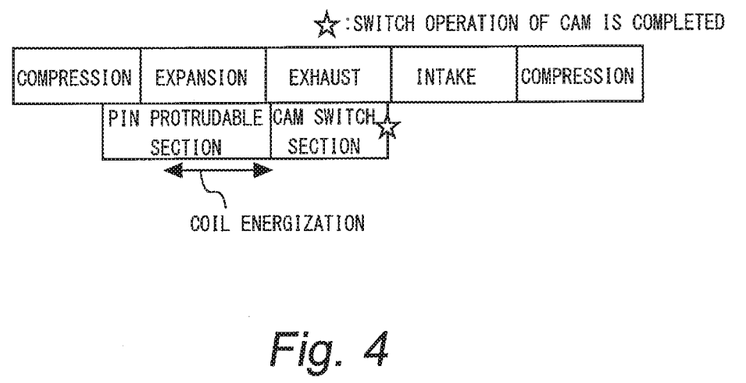
FIG. 4 is a diagram for illustrating a corresponding example between a switch operation of a cam and four strokes of an engine.

In the first embodiment, the small cams are mainly used to drive the intake valves during a normal operation of the engine (the normal operation excludes an operation when the engine is started, the same shall apply hereinafter). However, the large cams are surely used to drive the intake valves when the engine is started. FIG. 4 is a diagram for illustrating a corresponding example between a switch operation of a cam and four strokes of an engine. The switch operation of the cam is performed while the cam shaft rotates once. More specifically, the switch operation of the cam is started in a section from the middle stage of the compression stroke to the latter stage of the expansion shown in FIG. 4. This section corresponds to a period in which the pins face the orthogonal portion of the groove 18*b* or the groove 18*c* illustrated in FIG. 3B. That is, this section corresponds to a period during which the protruding operation of the pins is possible. Therefore, in FIG. 4, such section is denoted as "pin protrudeable section". The energization of the exciting coil for protruding the pins is performed within the section.

After the expansion stroke shown in FIG. 4, substantial cam switch is performed in a section substantially coincident with the exhaust stroke. This section corresponds to a period in which the pin 20 or the pin 22 moves along the inclined portion of the groove 18*b* or the groove 18*c* illustrated in FIG. 3C. When the section elapses, switch operation of the cam is completed. Therefore, in FIG. 4, such section is denoted as "cam switch section". Note that following the "cam switch section", the retract operation of the pins is performed by pushing the pin 20 or the pin 22 from the shallow groove of the groove 18*a* illustrated in FIG. 3D.

[Characteristic of Control in First Embodiment]

In the system in which the small cams are mainly used during the normal operation, it is expected in many cases that the small cams are used as the drive cams at a timing when a stop request to the engine (a stop request for driving the fuel injection valve and the ignition device, the same applies hereinafter) is issued. Therefore, in the first embodiment, it is determined whether all of the drive cams are the large cams when the stop request to the engine is issued. When it is determined that at least one of the small cams is included in the drive cams, the engine is continued to drive for a while and a switch control for switching the drive cams from the small cams to the large cams is executed within the duration. Hereinafter, the switch control executed during the duration is also referred to as "stop duration control". In the stop duration control, a switch request to the large cams is output. Further, in the stop duration control, the fuel injection valve and the ignition device are controlled so as to maintain the fuel injection amount and the ignition timing just before the stop request is issued.

However, when the fuel injection valve and the ignition device are continued to control until the protrusion operation and the retract operation of all the pins are completed in accordance with the switch request, fuel consumption deteriorates accordingly. Therefore, in the stop duration control of the first embodiment, a cam carrier whose slide order in accordance with the switch request is the last of the cam carriers (hereinafter referred to as "final cam carrier") and a cylinder which corresponds to the final cam carrier (hereinafter referred to as "final cylinder") are specified at the timing when the stop request is issued. Further, in the stop duration control, the control of the fuel injection device and the ignition device are stopped at a timing when a period during which the protruding operation of a pin to switch the intake cam of the final cylinder (hereinafter referred to as "final pin") is possible has elapsed.

Figure 5:
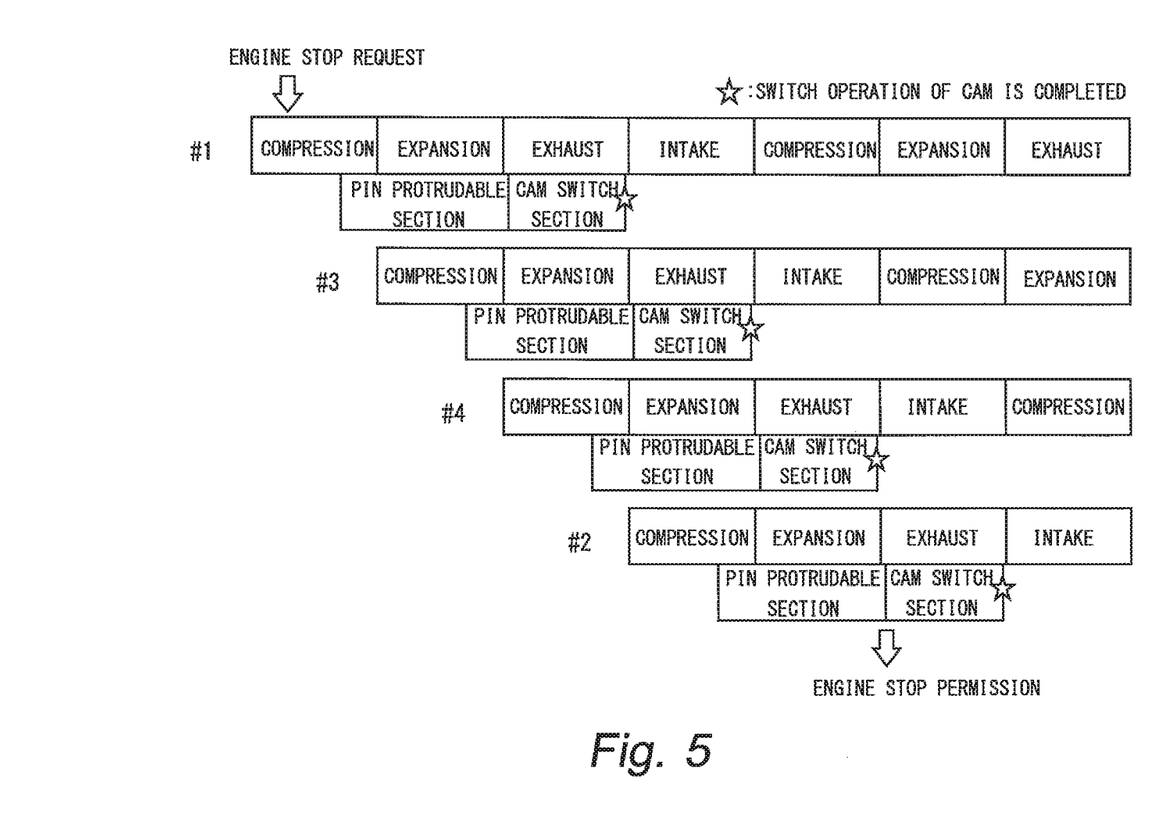
FIG. 5 is a diagram for illustrating an example of stop control executed in the first embodiment of the present disclosure.

FIG. 5 is a diagram for illustrating an example of stop control executed in the first embodiment. In FIG. 5, it is assumed that the stop request to the engine has been issued in the initial stage of the compression stroke of the first cylinder #1. When it is determined that all of the drive cams are the small cams, the switch operation to the large cams will be performed in the order of the first cylinder #1, the third cylinder #3, the fourth cylinder #4 and the second cylinder #2. Therefore, it is specified that the final cylinder is the second cylinder #2.

As shown in FIG. 5, in the stop duration control of the first embodiment, a permission to stop the engine is issued at a timing when the "pin protrudeable section" of the final cylinder has elapsed. At the timing when the engine stop permission is issued, the "cam switch sections" of the first cylinder #1, the third cylinder #3 and the fourth cylinder #4 (hereinafter referred to as "non-final cylinders") have elapsed. Therefore, substantial switch to the large cams have completed in the non-final cylinders. On the other hand, in the final cylinder, the "pin protrudeable section" has just elapsed and the "cam switch section" has not elapsed. That is, the last cylinder has reached the "cam switch section" and even the substantial switch to the large cam has not started.

However, in the first embodiment, the self-holding type solenoid illustrated in FIG. 2 is used as the actuator. Therefore, a protrusion condition of the final pin is maintained after the timing when the engine stop permission is issued. Thus, the engagement between the groove of the final cam carrier and the final pin is maintained. Then, when the camshaft rotates during cranking at a time of engine restart after the permission timing, the final cam carrier slides and the "cam switch section" of the last cylinder shown in FIG. 5 will be elapsed. As just mentioned, according to the stop duration control of the first embodiment, the fuel injection device and the ignition device can be stopped without waiting for the elapse of the "cam switch section" of the last cylinder. Thus, it is possible to suppress reduction of fuel consumption in association with the execution of the stop duration control.

[Specific Processing]

Figure 6:
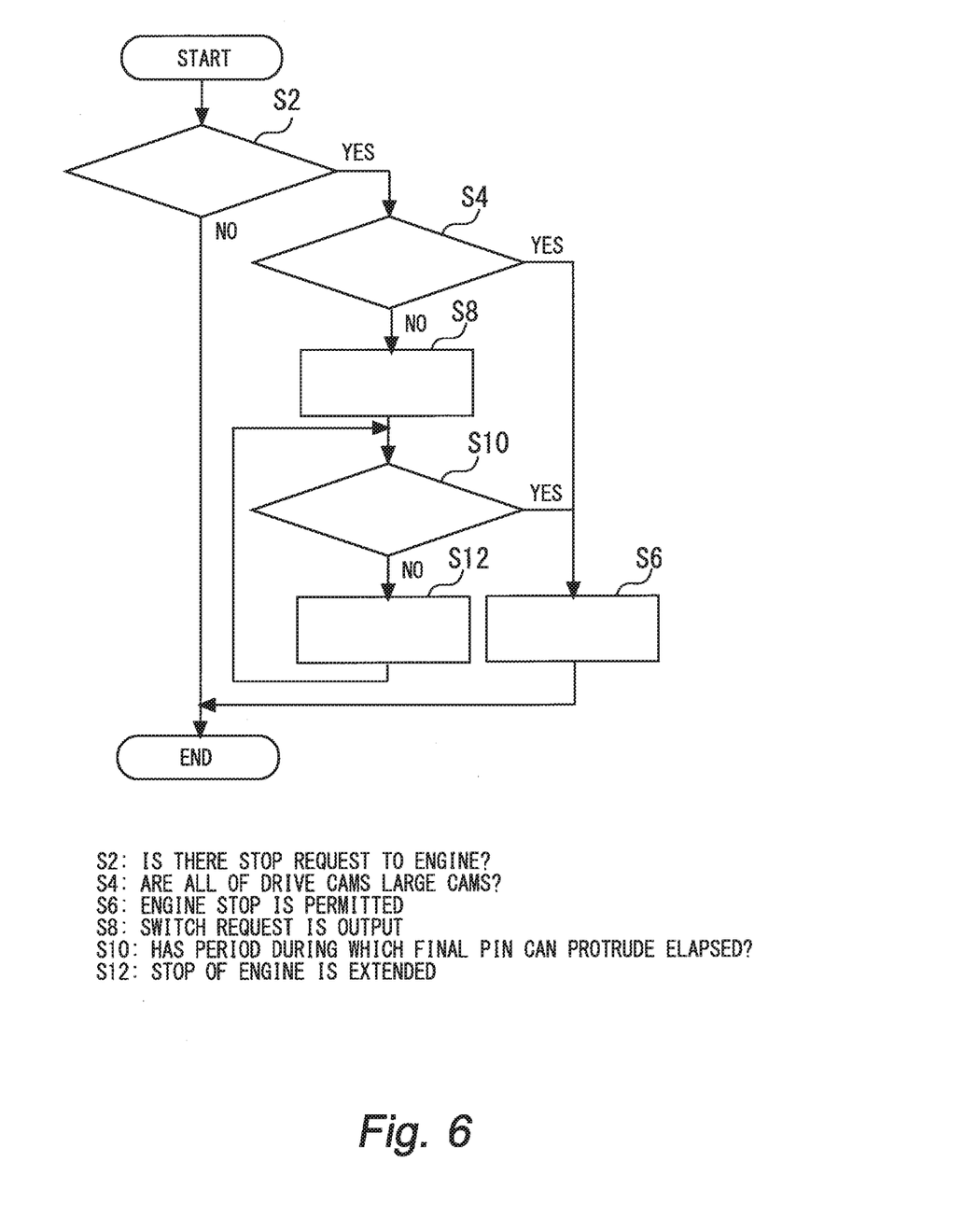
FIG. 6 is a flowchart for illustrating an example of a process routine executed by an ECU in the first embodiment of the present disclosure.

FIG. 6 is a flowchart for illustrating an example of a process routine executed by an ECU in the first embodiment. It is assumed that the process routine is executed in every control period (for example, every time when the crankshaft rotates by 90°).

In the routine shown in FIG. 6, firstly, it is determined whether there is a stop request to the engine (step S2). The presence or absence of the stop request is determined based on, for example, whether or not the ECU has received the IG-OFF signal from the ignition key 56 shown in FIG. 1. The IG signal is output when a driver of a vehicle performed a predetermined operation (for example, an operation of turning the ignition key 56 to a predetermined position, or the like). When it is determined in step S2 that there is no stop request, the routine is ended.

When the determination result in step S2 is positive, it is determined whether or not all of the drive cams are the large cams (step S4). Whether the large cam has been switched or not is determined based on the output of the gap sensor 54 shown in FIG. 1. When the determination result in step S4 is positive, it can be determined that it is unnecessary to continue to drive the engine for switching to the large cams. Therefore, engine stop permission is issued (step S6). As a result, the driving of the fuel injection valve and the ignition device is stopped.

On the other hand, when the result of the determination in step S4 is negative, a switch request to the large cam is output to the solenoid (step S8). As a result, the switch operation of the cam is started. The switch operation of the cam is as already explained in FIGS. 3 to 5. Note that since the drive cam of each cylinder can be specified by the output of the gap sensor, it is possible to perform only the switch operation of the cam that needs to be switched.

Subsequent to step S8, it is determined whether or not a period during which the final pin can protrude (pin protrudeable section) has elapsed (step S10). The pin protrudeable section is separately calculated in accordance with the engine speed at the timing when the stop request to the engine is issued. Note that the pin protrudeable section is as already explained in FIGS. 4 to 5. Then, when the determination result in step S10 is positive, the engine stop permission is issued (step S6). On the other hand, when the result of the determination in step S10 is negative, the stop of the engine is extended (step S12) and the process returns to step S10.

According to the routine illustrated in FIG. 6, when there is the stop request to the engine, it is possible to shorten the duration to continue driving the fuel injection device and the ignition device in association with the switch request. Therefore, it is possible to suppress deterioration of fuel consumption in association with the stop duration control.

In the first embodiment described above, the orthogonal portion of the groove 18b or the groove 18c illustrated in FIG. 3B corresponds to the "first orthogonal groove" of the second aspect. The inclined portion of the groove 18b or the groove 18c illustrated in FIG. 3C corresponds to the "inclined groove" of the same aspect. The groove 18a illustrated in FIG. 3D corresponds to the "second orthogonal groove" of the same aspect.

Second Embodiment

Figure 7:
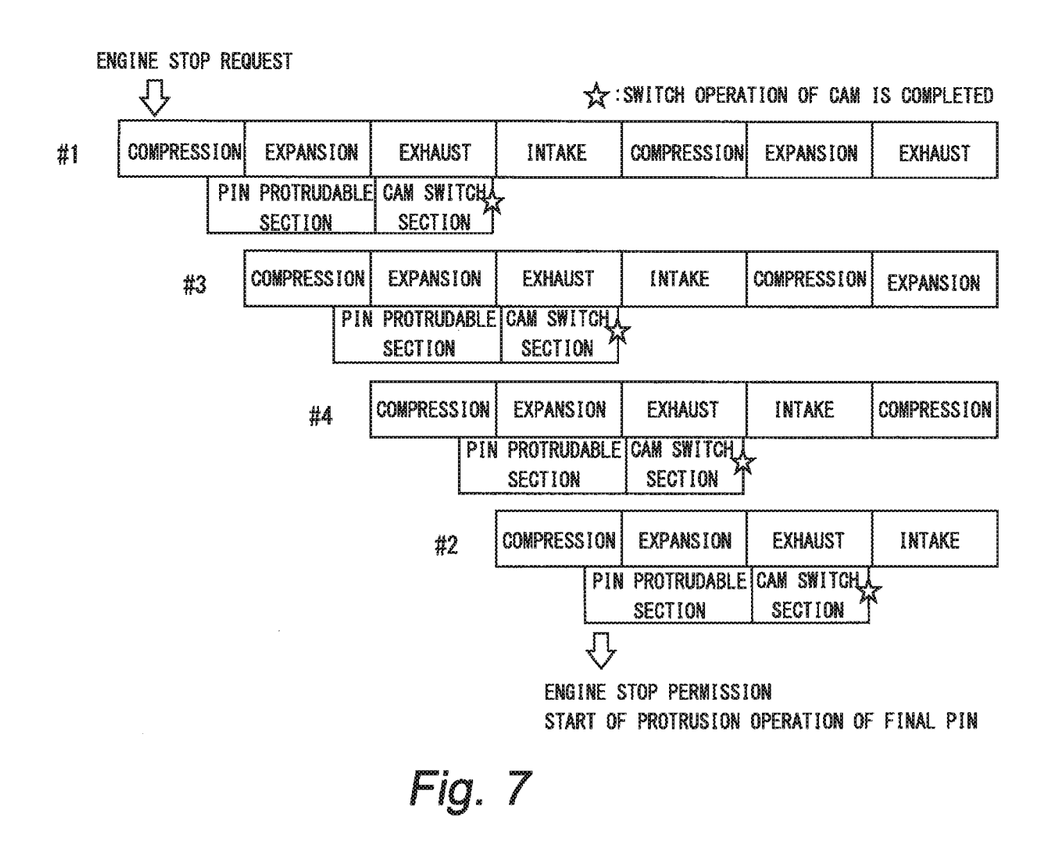
FIG. 7 is a diagram for illustrating an example of stop control executed in a second embodiment of the present disclosure.

Next, a second embodiment of the present disclosure will be described with reference to FIGS. 7 and 8.

Note that a configuration example of a system in the second embodiment is common to the configuration example illustrated in FIG. 1. The switch operation of the drive cam is as described in FIGS. 3 to 5. Therefore, the descriptions about the system configuration example and the switching of the drive cam are omitted.

[Characteristic of Control in Second Embodiment]

In the first embodiment, when the stop request to the engine is issued, the stop of the engine is permitted at the timing when the period during which the protrusion operation of the final pin is possible has elapsed. In the second embodiment, the timing to permit engine stop is further advanced. FIG. 7 is a diagram for illustrating an example of stop control executed in a second embodiment. The prerequisite contents of FIG. 7 are the same as those described in FIG. 5. That is, in FIG. 7, at the initial stage of the compression stroke of the first cylinder #1, the stop request to the engine is issued. Then, it is determined that all of the drive cams are the small cams, and the switch operation is performed in the order of the first cylinder #1, the third cylinder #3, the fourth cylinder #4, and the second cylinder #2.

In the second embodiment, at the timing when the "cam switch section" of the second cylinder #2 which is specified as the last cylinder arrives, the engine stop permission is issued. Therefore, as compared with the first embodiment, it is possible to further suppress deterioration of fuel consumption in association with the stop duration control. However, in the second embodiment, the exciting coil is energized for causing the final pin to protrude after the engine stop permission is issued. When the protrusion operation of the final pin is started once, the last cam carrier can be engaged with the final pin by continuing the protrusion operation at engine cranking at the subsequent restart by continuing the protrusion operation of the final pin over the engine stop period. When the camshaft rotates at the restart, the final cam carrier in the engaged state slides and then the "cam switch section" shown in FIG. 7 elapses.

In the second embodiment, the energization period α to the exciting coil which corresponds to the final cylinder (hereinafter also referred to as "final coil") may set to be a period shorter than the period indicated as "coil energization" in FIG. 4. That is, the energization period α may set to be the shortest period within which the final pin can start the protrusion operation. When the energization period α is set to be such a period, it is also possible to minimize deterioration of fuel consumption in association with the energization of the final coil.

[Specific Processing]

Figure 8:
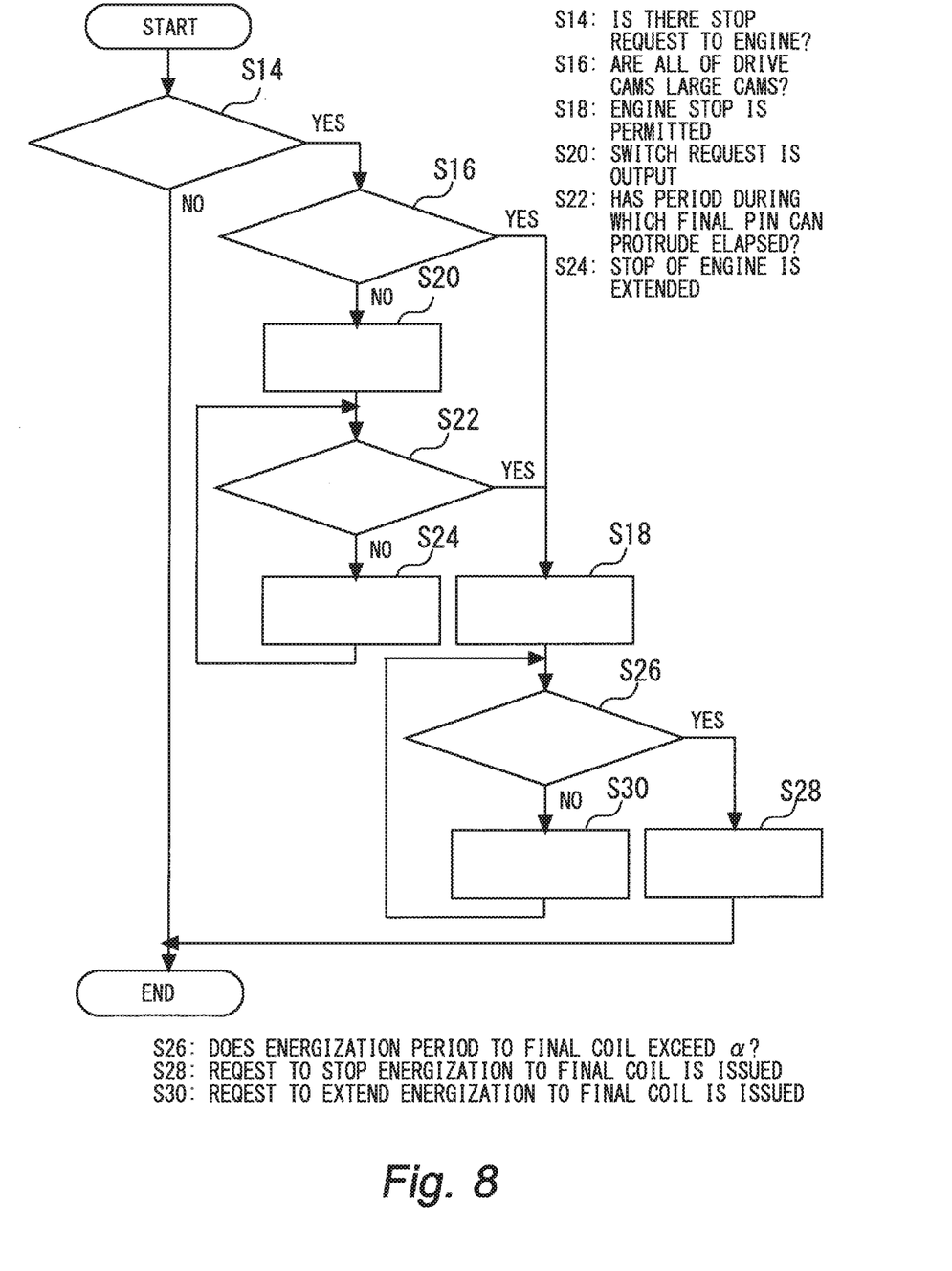
FIG. 8 is a flowchart illustrating an example of a process routine executed by the ECU in the second embodiment of the present disclosure.

FIG. 8 is a flowchart illustrating an example of a process routine executed by the ECU in the second embodiment. It is assumed that the process routine is executed in every control period (for example, every time when the crankshaft rotates by 90°).

In the routine shown in FIG. 8, firstly, the processing of steps S14 and S16 is executed. The processing in steps S14 and S16 is the same as the processing in steps S2 and S4 in FIG. 6, respectively. Also, the processing of step S18 executed when the determination result of step S16 is positive is the same as the processing of step S6 of FIG. 6. The process of step S20 executed when the determination result of step S16 is negative is the same as the process of step S8 of FIG. 6.

Subsequent to step S20, it is determined whether or not a period during which the final pin can protrude (pin protrudeable section) has arrived (step S22). The pin protrudeable section is separately calculated according to the engine speed at the timing when the stop request to the engine is issued. Note that the pin protrudeable section is as already explained in FIGS. 4 to 5. Then, when the determination result in step S22 is positive, the engine stop permission is issued (step S18). On the other hand, when the determination result in step S22 is negative, the stop of the engine is extended (step S24) and the process returns to step S22.

Subsequent to step S18, it is determined whether or not the energization period to the final coil exceeds the energization period α (step S26). The energization period α is as described above. When the result of the determination in step S26 is positive, a request to stop energization to the final coil is issued (step S28). On the other hand, when the result of the determination in step S26 is negative, a request to extend the energization to the final coil is issued (step S30), and the process returns to step S26.

According to the routine illustrated in FIG. 8, when there is the stop request to the engine, it is possible to further shorten the duration to continue driving the fuel injection device and the ignition device in association with the switch request. Therefore, it is possible to suppress deterioration of fuel consumption in association with the stop duration control. When the energization period α is set to be shorter period, it is also possible to minimize the deterioration of fuel consumption caused by energization of the final coil performed after issuing the engine stop permission.

Third Embodiment

Figure 9:
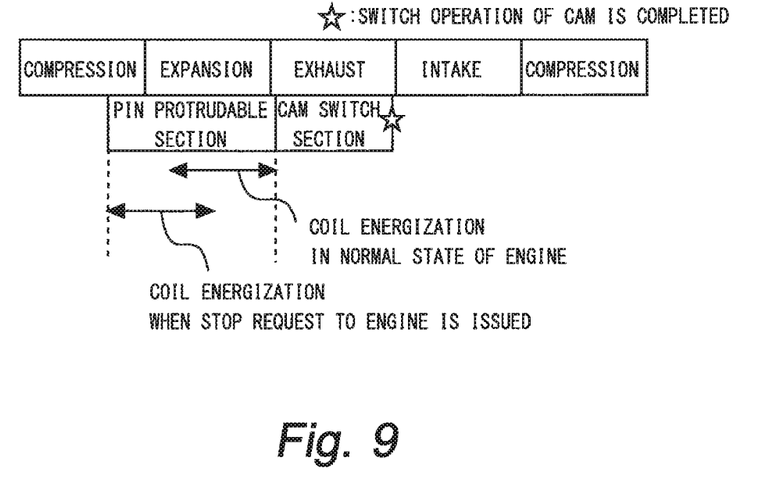
FIG. 9 is a diagram for illustrating an example of a switch control executed in a third embodiment of the present disclosure.

Next, a third embodiment of the present disclosure will be described with reference to FIGS. 9 and 10.

Note that a configuration example of a system in the third embodiment is common to the configuration example illustrated in FIG. 1. The switch operation of the drive cam is as described in FIGS. 3 to 5. Therefore, the descriptions about the system configuration example and the switching of the drive cam are omitted.

[Characteristic of Control in Third Embodiment]

In the first embodiment, the energization of the exciting coil for the protrusion operation is performed in the "pin protrudeable section" shown in FIG. 4. Further, in the first embodiment, the period indicated as "coil energization" in FIG. 4 is set immediately before the "cam switch section" shown in the same figure. The reason tier this is to set the timing to start the protrusion operation of each pin as late as possible and reliably switch the cams in consideration of the responsiveness of the pin to the switch request of the cam.

On the other hand, as described in the second embodiment, when energizing the final coil far causing the final pin to protrude after the engine stop permission is issued, it is possible to minimize the deterioration of fuel consumption caused by the energization of the final coil by setting the energization period α to be the shortest period.

In the third embodiment, therefore, the start timing of the protrusion operation of each pin in a normal state of the engine is set to the latest timing. Whereas in the stop duration control, the start timing of the protrusion operation of each pin is set to the earliest timing. Only the start timing of the protrusion operation of the final pin may be set to the earliest timing. FIG. 9 is a diagram for illustrating an example of a switch control cam executed in the third embodiment. As shown in FIG. 9, in the normal state of the engine, the start timing of the "coil energization" is set so that energization to each of the exciting coil ends just before the "cam switch section". On the other hand, when the stop request to the engine is issued, the start timing of the "coil energization" is set so that energization to each of the exiting coil starts from the beginning of the "pin protrudeable section".

Therefore, according to the third embodiment, it is possible to surely perform the switching of the drive cams in the normal state of the engine while minimizing the deterioration of the fuel consumption caused by the energization of the final coil in the stop duration control.

[Specific Processing]

Figure 10:
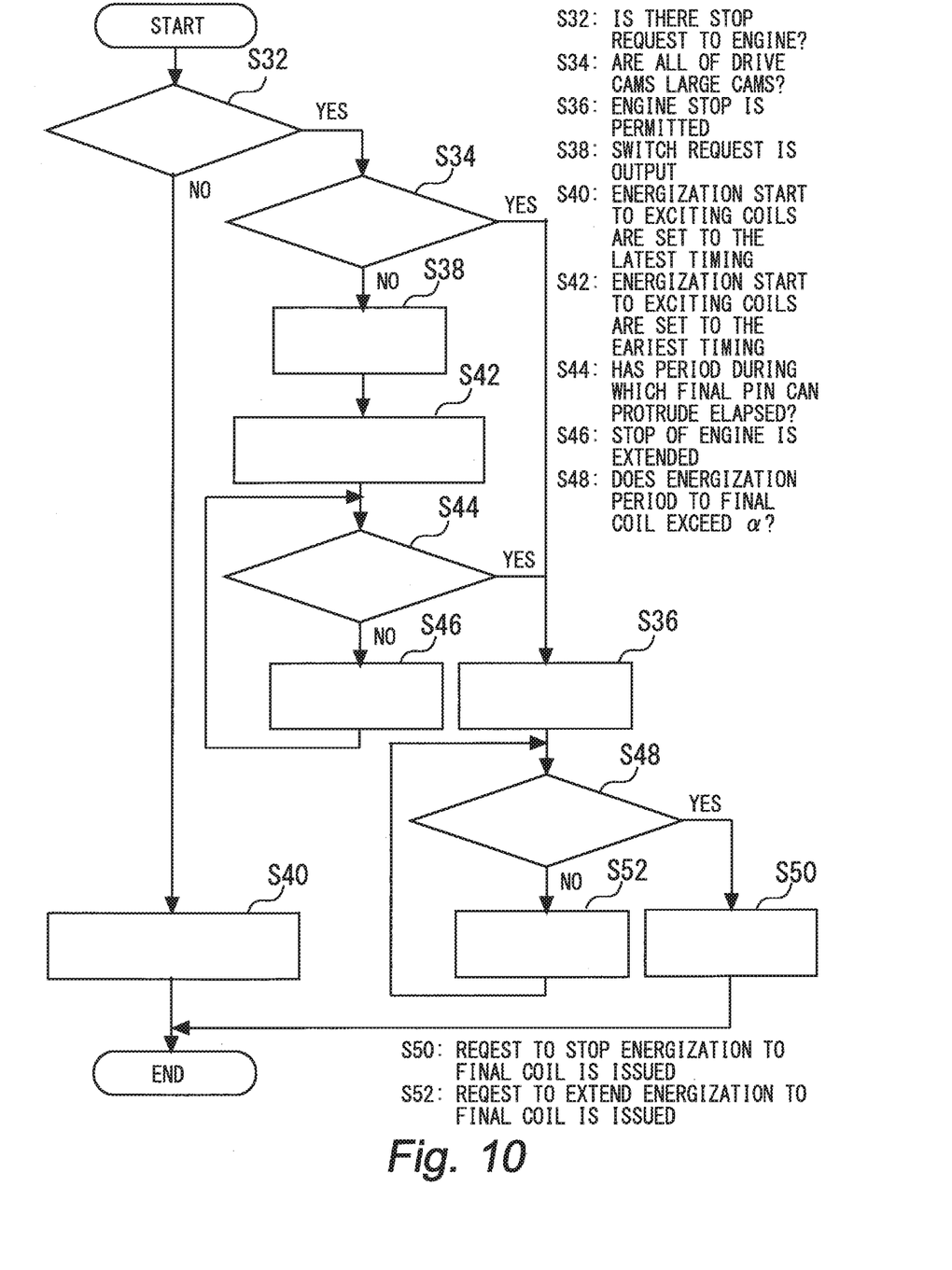
FIG. 10 is a flowchart for illustrating an example of a process routine executed by an ECU in the third embodiment of the present disclosure.

FIG. 10 is a flowchart illustrating an example of a process routine executed by the ECU in the third embodiment. It is assumed that the process routine is executed in every control period (for example, every time when the crankshaft rotates by 90°).

In the routine shown in FIG. 10, firstly, the processing of steps S32 and S34 is executed. The processing in steps S32 and S34 is the same as the processing in steps S2 and S4 in FIG. 6, respectively. Also, the processing of step S36 executed when the determination result of step S34 is positive is the same as the processing of step S6 of FIG. 6. The process of step S38 executed when the determination result of step S34 is negative is the same as the process of step S8 of FIG. 6. In the routine shown in FIG. 10, however, when the determination result of step S32 is negative, the energization start to the exciting coils are set to the latest timing (step S40).

Subsequent to step S38, the energization start to the exciting coils are set to the earliest timing (step S42). Then, the processing from step S44 to step S52 is executed. The processing from step S42 to step S52 is the same as the processing from step S22 to step S30 of FIG. 8.

According to the routine illustrated in FIG. 10, it is possible to surely perform the switching of the drive cam in the normal state of the engine while minimizing the deterioration of the fuel consumption caused by the energization of the final coil in the stop duration control.

Other Embodiments

In the above described first embodiment, FIG. 1 illustrates an example in which four cam carriers 12 are arranged around the cam shaft 10 of the inline four-cylinder engine, that is, the cam carriers 12 are arranged for each cylinder. However, the cam carrier 12 may be arranged across two or more cylinders. Such an arrangement example is disclosed in JP 2009-228543 A. That is, regardless of what kind of cam carrier configuration is adopted, it is possible to apply the switch control according to the first to third embodiments when the switching of the drive cams based on the slide of the cam carrier is not carried out in all cylinders at once but is carried out in units of cylinders or cylinder groups.

Further, in the first to third embodiments, an example in which the small cams are mainly set as the drive cams during the normal operation of the engine whereas the large cams are set as the drive cams when the engine is started. However, the relationship between the operating state of the engine and the driving cams is merely an example. That is, the large cams may be mainly set as the drive cams during the normal operation of the engine whereas the small cams may be set as the drive cams when the engine is started. Even in such arrangement case, it is possible to apply the switch control according to the first to third embodiments. Note that, in this case, when the stop request to the engine is issued, it is necessary to determine whether all of the drive cams are small cams, and to execute a switch control for switching the drive cams from the large cams to the small cams in accordance with the determination result.

What is claimed is:

1. An internal combustion engine system comprising:
   an internal combustion engine having multiple cylinders;
   an intake valve which is provided in each of the cylinders;
   a first intake cam with a first cam profile; a second intake cam with a second cam profile different from the first cam profile, one of the first and second intake cams is selected as a drive cam for driving the intake valve;
   multiple cam carriers which are provided on a camshaft of the internal combustion engine, each of the cam carriers carries the first and second intake cams in units of cylinders or cylinder groups;
   multiple actuators which are provided corresponding to the multiple cam carriers and are configured to slide the multiple cam carriers in an axial direction of the camshaft sequentially in accordance with protrusion operation of pins, wherein the pins are configured to engage with the corresponding cam carriers and also to switch drive cams for driving the intake valve between the first and second intake cams; and an electronic control unit configured to:

output a switch request of the drive cams to the multiple actuators when a stop request to the internal combustion engine is issued and also it is determined that the drive cams include a different profile from a predetermined profile; and output a stop request to the internal combustion engine at a predetermined timing with respect to a start of the protrusion operation of a final pin which engages with a final cam carrier and also before a start of a slide of the final cam carrier, wherein slide order of the final cam carrier in accordance with the switch request is a last of the cam carriers.

2. The internal combustion engine system according to claim 1, wherein each of the multiple cam carriers comprises:

a first orthogonal groove which is orthogonal to the camshaft;

an inclined groove with a first end and a second end, the inclined groove being inclined with respect to the axial direction of the camshaft and the first orthogonal groove, the first orthogonal groove communicates with the inclined groove at the first end; and a second orthogonal groove which is orthogonal to the camshaft and communicates with the inclined groove at the second end of the inclined groove, wherein the switch request is a request to cause the pins to protrude while being opposed to the first orthogonal groove and then to move in order from the first orthogonal groove, through the inclined groove and into the second orthogonal groove, wherein the predetermined timing is a timing before the final pin enters the inclined groove of the final cam carrier.

3. The internal combustion engine system according to claim 2, wherein the predetermined timing is a start timing of the protrusion operation of the final pin.

4. The internal combustion engine system according to claim 3, wherein the multiple actuators are self-holding type solenoids which are configured to cause the pins to protrude by energizing an exciting coil and keep the pins protruding even after the energization to the exciting coil is cut off, wherein, when the stop request has been issued, the switch request includes a request to start energizing the exciting coil of a solenoid corresponding to the final cam carrier so that the protrusion operation of the final pin is started at a timing that is earlier than a timing of the start of the protrusion operation of the final pin during a normal state when the stop request has not been issued.

* * * * *